June 17, 1952  E. N. NATKINS  2,600,674
COMBINED FLEXIBLE COUPLING AND OVERLOAD CLUTCH
Filed March 1, 1948  2 SHEETS—SHEET 1
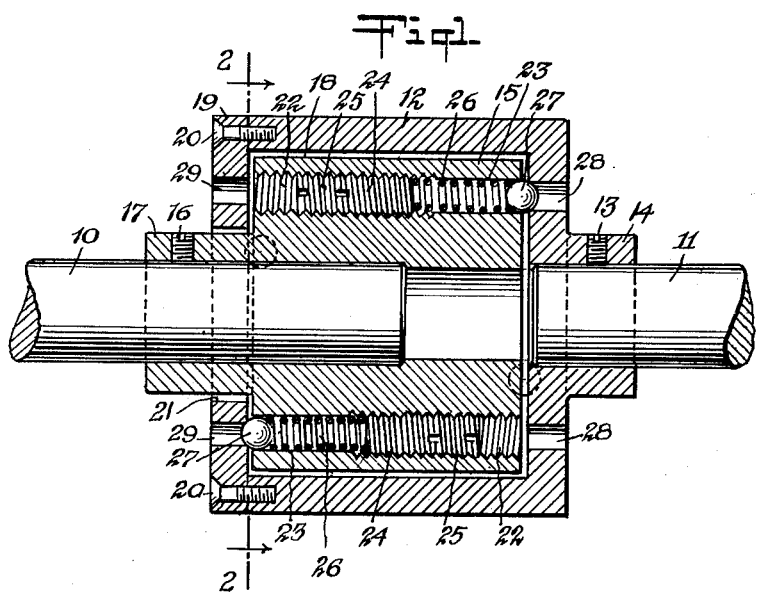
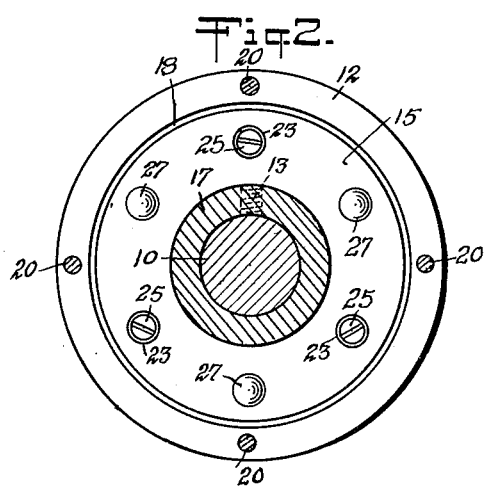
INVENTOR.
Efrem N. Natkins
BY
Mumm, Liddy & Glaccum
Attorneys June 17, 1952     E. N. NATKINS     2,600,674
COMBINED FLEXIBLE COUPLING AND OVERLOAD CLUTCH
Filed March 1, 1948     2 SHEETS—SHEET 2
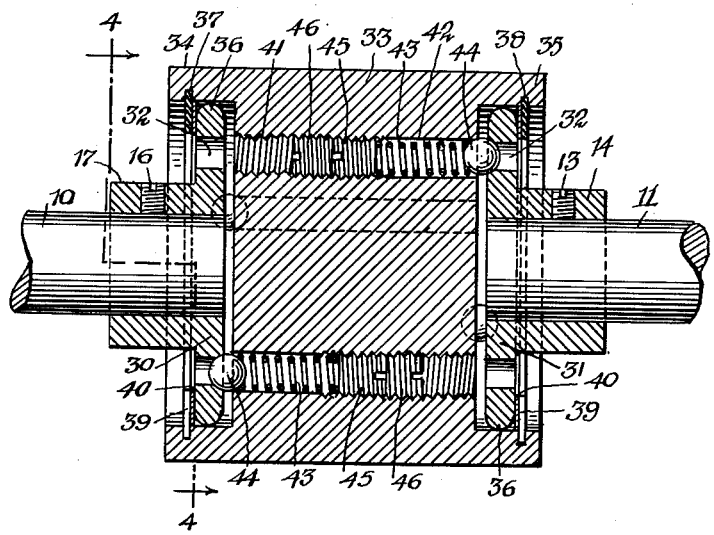
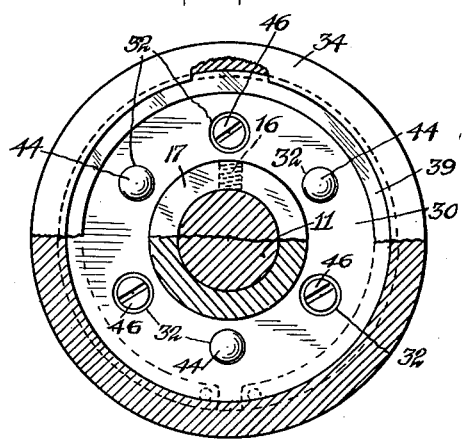
INVENTOR.
Efrem N. Natkins
BY
Munn, Liddy & Glaccum
Attorneys Patented June 17, 1952

2,600,674

UNITED STATES PATENT OFFICE 2,600,674

COMBINED FLEXIBLE COUPLING AND OVERLOAD CLUTCH

Efrem N. Natkins, New York, N. Y.

Application March 1, 1948, Serial No. 12,243

4 Claims. (Cl. 64—29)

This invention relates to new and useful improvements in driving devices and especially to one which is a combined flexible overload coupling.

An object of the invention is to provide a device which is composed of a few simple, strong, durable parts which can be quickly and easily assembled and disassembled for adjustment, replacement, and repair.

A further object is to provide a simple economical device which will automatically adjust itself to reasonable variations in axial disalignment of the connected shafts between which the device is interposed.

A still further object is to provide a device having the above features which also acts automatically as an overload coupling to disengage instantly when an overload occurs and to reengage instantly when the overload is removed.

Further and more specific objects, features and advantages will more clearly appear from a consideration of the detailed specification hereinafter set forth, especially when taken in connection with the accompanying drawing which illustrates a present preferred form which the invention may assume and which forms part of the specification.

In brief and general terms, the invention comprises a pair of shafts which are capable of being angularly disaligned and axially displaced and means disposed between the adjacent ends of said shafts permitting driving engagement during such disalignment and slippage between them when an overload occurs.

More particularly, the invention comprises a pair of shafts which are capable of angular and/or lateral parallel displacement with elements connected to the respective shafts to connect them for driving purposes, these elements being related for clearance to permit such displacement and resiliently connected to permit slippage when overload occurs.

Still more particularly the invention with respect to the overload means includes cooperation between spring-pressed balls and suitable recesses to maintain driving relation between the parts except when under overload stresses.

In one form thereof, the invention comprises a rotary enclosing member, a rotary head member loosely disposed therein and slip connections between said members. The looseness of one member within the other, due to predetermined clearance therebetween, permits axial disalignment of the shafts connected to said members without disengagement of the parts during driving action, and the slip connections, preferably of the ball and socket type, will allow driving during normal loads and permit instant disengagement when overloads occur.

More particularly, this form of the device comprises a cup-shaped enclosing rotary member loosely receiving a rotary solid cylindrical head having bores in which are disposed spring-pressed balls to engage in recesses on adjacent surfaces of the enclosing member and which connection allows instant slippage when overloads occur.

Another form of the invention comprises shafts to be coupled with adjacent ends spaced apart but in normal alignment. Flange plates are disposed on these shafts and facing each other. Between the flange plates is freely disposed a rotatable block with resilient connections, such as ball and socket connections between the adjacent faces of the plates and the block to allow slip on overload. Portions of the block overlie the opposite faces of the flange plates and allow considerable movement of the edges of the plates therebetween to permit angular and lateral parallel displacement without disengagement of the parts during rotation.

Preferred forms which the invention may assume are illustrated in the drawings of which—

Fig. 1 is a central vertical longitudinal section taken through the coupling;

Fig. 2 is a vertical cross section taken on the line 2—2 of Fig. 1;

Fig. 3 is a central vertical longitudinal section taken through a modified form of the coupling; and Fig. 4 is a vertical cross section taken on the line 4—4 of Fig. 3.

Referring now merely to the specific embodiment of the invention illustrated in Figs. 1 and 2, it is to be seen that the invention aims at a flexible overload coupling between two shafts 10 and 11. To one shaft 11 there is fixed a cup-shaped casting or coupling member 12 fixed, by set screw 13 on hub 14, to the shaft 11.

Rotatably disposed within the cup 12 is a coupling element in the form of solid casting head 15 fixed to shaft 10 by means of set screw 16 on hub 17. As shown in the form illustrated, there is ample clearance space all around the inner coupling head 15 and the outer coupling cup 12 and this space allows for desired angular displacement of the shafts without disturbing the driving capacity. Thus the flexibility of the coupling is insured. If no flexibility is desired, then this clearance space is eliminated by machining the outer surface of inner head 15 to have a rolling fit within the cup 12.

The open end of the cup 12 is partially closed by means of a ring plate 19 fastened thereto by screws 20 and having a central opening of sufficient diameter to provide a clearance space 21 around the hub 17 and shaft 10 to permit angular flexion of the shaft 10, with respect to the shaft 11.

The rotating inner head casting 15 is provided with six bores extending preferably longitudinally therethrough from face to face. Each bore is threaded along one portion as indicated at 22 and has a smooth portion 23 at the other end. As shown, adjacent bores have their threaded and smooth portions reversed. In each threaded portion of the bores there is adjusted a set screw 24 backed up by a lock screw 25. In the smooth portions of the bores are disposed coiled springs 26 which at one end bear against the set screws 24 and at the other end press against clutch or overload balls 27, and therefore tend to press these balls outwardly under determined pressure.

It will therefore be observed that there will be three balls projecting from the head 15 on one face and three projecting from the opposite face as shown. To provide engagement between the balls and the rotating hollow cup coupling element 12 the base wall of said element is provided with three through bores 28 and the plate 19 is provided with three similar bores 29. These bores 28 and 29 are angularly disposed to partially receive the balls 27, whereby the coupling elements may rotate together, and at the same time permit the two shafts, because of the clearance space between said coupling elements on all sides, to have a certain degree of angular or axial displacement which makes the device flexible.

It is also obvious that, when the load between the two shafts exceeds a predetermined amount, the resistance to movement of the driven shaft will cause the balls 27 to be pushed back against the pressure of their springs 26 whereby their engagement or coupling action is removed and the one element can then rotate independently of the other. Of course, as soon as the resistance is removed, the balls will then snap back into position as soon as they are aligned with the ends of the bores 29. It is, of course, understood that these bores 29 are cut through the element 12 merely for the purpose of ease in getting at the set screws and the balls in the bores in the head 15 and that otherwise they might as well be notches or shallow recesses in the faces of the base of the cup 12 and the plate 19.

In the form of the invention shown in Figs. 3 and 4, it is seen that there are the two shafts 10 and 11 as before with hubs 17 and 14 thereon respectively and held in place thereon by means of set screws 16 and 13. However, in this form the hubs have on their adjacent ends flange plates 30 and 31 in the form preferably of circular disks with a suitable number of through apertures 32 therein.

Disposed between the adjacent faces of the disks 30 and 31 and spaced therefrom are adjacent faces of the main body of a rotatable block or die cast element 33 which has oppositely extending peripheral flanges 34 and 35 which overhang the peripheral edges of the disks 30 and 31. The outer edges of the disks are rounded as at 36 and lightly contact with the inner surface of these flanges of the block 33. The flanges 34 and 35 are provided with under-cut grooves 37 and 38 in which are disposed preferably steel ring-shaped washers 39. These washers are so disposed on the flanges so as to lie adjacent the respective outer faces of the disks 30 and 31 and adjacent faces of these washers are lined with rings 40 of formica or similar material.

The block 33 is provided with a series of bores which each are threaded at one end as at 41 and smooth at the other end as at 42. In the smooth ends of the bores are disposed coiled springs 43 and balls 44 pressed by the springs and at the other end of the springs are set screws 45 and lock nuts 46. The balls 44 are pressed normally into seating relation with the adjacent ends of the apertures 32 in the disks 30 and 31, respectively. As in the first described form of the invention, this construction provided a simple and effective means for providing slippage when overload is applied to the device and yet affords instant reengagement when the overload has ceased.

It will thus be seen that the block 33 is connected between the disks 30 and 31 only by the resilient connection through the spring-pressed balls and that the angular or parallel lateral displacement between the shafts is provided for by the free play between the block and the disks in the space between the adjacent faces of the block and the adjacent faces of the ring-shaped washers.

Thus it is obvious that there has been provided a simple, efficient, rugged, and inexpensive device which will automatically operate both as an overload clutch and as a flexible coupling. It is composed of a few simple parts which can be readily assembled and disassembled for inspection, replacement, and repair.

While the invention has been described in detail and shown with respect to the accompanying drawing, it is not to be limited to such details, since many changes and modifications may be made in the invention without departing from the spirit and scope thereof. Hence, it is desired to cover any and all forms and modifications of the invention which may come within the language and scope of any one or more of the appended claims.

What I claim as my invention is:

1. A flexible overload coupling which compises a pair of normally aligned shafts having ends spaced apart, circular disks on the ends of said shafts, a connecting block disposed between said shafts and having circular cup-shaped recesses in which said disks are disposed with their edges in line contact with the walls of said recesses, and flexible overload connections between the bottom of the recesses and the adjacent faces of the disks.

2. A flexible overload coupling which comprises normally aligned shafts with their ends spaced apart, circular disks on the ends of said shafts, a connecting block disposed between the ends of said shafts and having circular cup-shaped end recesses in which said disks lie so that their edges are in contact with the walls of said recesses, and resilient ball and socket connections between the bottom of the recesses and the adjacent faces of said disks.

3. A flexible overload coupling which comprises normally aligned shafts having adjacent ends spaced apart, circular apertured disks on the ends of said shafts, a connecting block disposed between the shafts and having circular cup-shaped recesses in which said disks are disposed, said block having bores, balls disposed normally in the apertures of said disks and held therein by springs in said bores.

4. A flexible overload coupling which comprises normally aligned shafts having adjacent ends spaced apart, circular apertured disks on the ends of said shafts, a connecting block disposed between the shafts and having circular cup-shaped recesses in which said disks are disposed, said block having bores, balls disposed normally in the apertures of said disks and held therein by springs for said bores, and retainer springs in the cup-shaped recesses disposed between the outer face thereof and an adjacent face of the disks.

EFREM N. NATKINS.

REFERENCES CITED

The following references are of record in the file of this patent:

UNITED STATES PATENTS

| Number | Name | Date |
|---|---|---|
| 1,141,461 | Hazelton | June 1, 1915 |
| 2,038,466 | Yates | Apr. 21, 1936 |
| 2,238,583 | Dodge | Apr. 15, 1941 |

FOREIGN PATENTS

| Number | Country | Date |
|---|---|---|
| 431,875 | Great Britain | 1935 |